July 15, 1930.  W. W. PECK  1,770,492

CHANGE SPEED MECHANISM

Filed March 27, 1929  5 Sheets-Sheet 2

Inventor
WILLIAM W. PECK
By Thomas L. Ryan
Attorney

July 15, 1930.  W. W. PECK  1,770,492
CHANGE SPEED MECHANISM
Filed March 27, 1929  5 Sheets-Sheet 3

Inventor
WILLIAM W. PECK
By Thomas L. Ryan
Attorney

July 15, 1930.  W. W. PECK  1,770,492
CHANGE SPEED MECHANISM
Filed March 27, 1929    5 Sheets-Sheet 4

Inventor
WILLIAM W. PECK
By Thomas L. Ryan
Attorney

Patented July 15, 1930

1,770,492

UNITED STATES PATENT OFFICE

WILLIAM W. PECK, OF MUNCIE, INDIANA, ASSIGNOR TO MUNCIE GEAR COMPANY, OF MUNCIE, INDIANA, A CORPORATION OF DELAWARE

CHANGE-SPEED MECHANISM

Application filed March 27, 1929. Serial No. 350,418.

This invention has reference to change speed mechanisms comprising a driving shaft and a driven shaft, and gearing and gears so coordinated, and which are adapted to be so positioned, that a change from one speed to another, of the driven shaft, may be obtained.

A mechanism of this class is of especial use as a part of the power plant of motor propelled vehicles, its several parts being so arranged and so retained in a housing provided therefor, that the mechanism as an entirety is self contained and it constitutes a unit which is adapted to be easily installed for service.

In change speed mechanisms of the present class as hitherto devised, there is the facility for the actuation of the driven shaft at first speed; and at increased speed designated as second; and then at a further increased speed designated as third; and at which last named speed the driven shaft is caused to move at speed the same as that of the driving shaft. Also there is the facility for the actuation of the driven shaft in a direction reverse to that of the driving shaft. With the increasing requirements imposed upon motor propelled vehicles, it has become desirable that a fourth speed change for the driven shaft may be had.

The object of the present invention is to provide a change speed mechanism by which besides obtaining the usual first, second and third speed changes, and the change to reverse; there may also be obtained a fourth speed change. In carrying out the above named general purpose, the aims of the invention are to provide a mechanism composed of a minimum number of parts so combined and arranged that the most quiet phases of operation are in the third and fourth speed changes. Further objects of the invention as same will be understood in reading the following specification are to provide a device of the kind described which is compact, strong and durable, and of relatively small dimensions, and which is economical of manufacture.

The several parts of the invention as they appear in the accompanying drawings, are identified by suitable characters of reference shown in the different views, in which—

Figure 3:
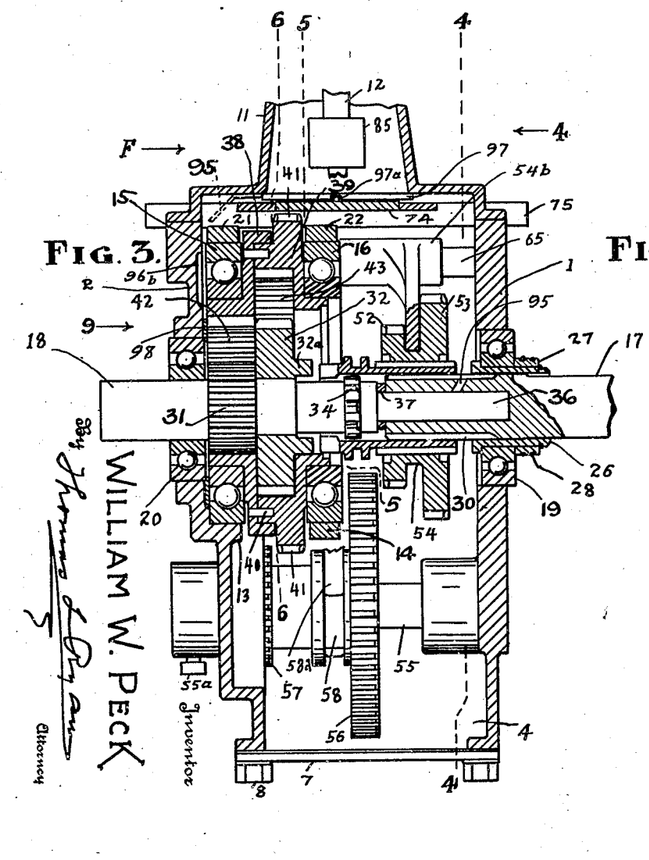
Figure 3 is a vertical longitudinal sectional view taken on the line 3—3 in Figure 2.

To assist to the ready understanding of the direction of movement of the several gears, as will be presently referred to, "forwardly" is indicated by the arrow F in Figure 3. "Right" and "left" are indicated by the arrows marked R and L, in Figure 12.

The invention, broadly stated, contemplates the providing of a gear fixed to or integral with the driven shaft, a gear mounted rotatably, and in concentric relation with said driven shaft the said rotatable gear having clutch surfaces, a gear structure mounted for rotative movement eccentric to the axis of said shaft, said gear structure having an external gear, and two internal gears, one of the internal gears being in mesh with the said gear that is fixed to the driven shaft, and the other of the said internal gears being in mesh with the said rotatable gear having the clutch surfaces, stub teeth on the driven shaft, splines on the driving shaft, gearing in the housing operable to establish transmission between the said splines and the said rotatable gear structure, and gearing operable to establish transmission between the said stub teeth of the driven shaft and the said splines of the driving shaft, and gearing operable to establish transmission between the said splines of the driving shaft, and the clutch surfaces of the said rotatable gear.

The foregoing combination and arrangement of parts affords facility whereby there is obtainable by the shifting of the certain parts of said transmission gearing, a first, second, third, and fourth or high speed actuation of the driven shaft, and also the usual reverse action for said driven shaft.

The invention further contemplates the providing of control means operable to engage for movement, any one of the several gear sets comprised in the aforesaid gearing, and to move said gear set into or out of operative position, and to maintain said gear set against dislocation from either of its said positions. The embodiment in which my invention is illustrated in the present specification, is of the form and structure suitable for vehicles of a relatively lighter class, the width of the housing being about seven inches. It will be understood that for unusually heavy duty, such as might be required in cars of the larger capacities wherein the driving and driven shafts are of diameter larger than two inches, minor changes in the proportions and dimensions of the several parts would be made, adherence being had however to the combination, and arrangement of parts, and the principles involved in the invention as described in the following specification and as defined in the appended claims.

The several mechanical parts of the mechanism are retained, in a cast metal housing of integrally formed type, having the end walls 1 and 2, and the side walls 3 and 4. In the wall 3 is an offset opening through which lubricant may be supplied for the interior of the housing, and which said opening is closed by a suitable plug 5. At the bottom of one of the housing walls is provided an opening, for the discharge, when desired, of the sedimentary contents, and which said opening is closed by a plug 6. The bottom of the housing is closed by a suitable plate 7 and paper gasket, secured by cap screws 8. The top of the housing is closed by the usual cover plate 9, which said cover plate and its gasket, are secured by cap screws 10. Formed integral with the said cover plate (see Figure 1) is a hollow pedestal 11 for the ball and socket bearing joint 89, and the stem 12, of the shift lever L common in change speed devices.

An inclined deflector plate 95 (see Figure 3) a horizontally faced bearing boss 96, and a guard channel 97 (see Figure 4) secured to the underside of the said cover plate, perform the functions presently to be referred to.

Upon the interior of the said housing is an integrally formed ledge 13, and an integrally formed support web 14, the said ledge and the said web each having a machined arcuate seat upon which are supported ball bearings 15 and 16 respectively. These ball bearings thus are supported at spaced apart position, and at position eccentric to the axial center of the aligned driving shaft 17 and the driven shaft 18, which are journaled in the ball bearings 19 and 20 respectively. All of the said ball bearings are of standard construction, each consisting of an inner ring and an outer ring with interior grooves constituting trackways in which the spaced steel balls are adapted to roll. The outer rings of the ball bearings 15 and 16 are held firmly in position by semicircular bands 21 and 22, whose foot lugs 23 are fastened to the housing lugs 24 by cap screws 25.

The driving shaft and driven shaft may be of similar diameters. A substantial mounting for the driving shaft consists of a shouldered bushing 26 in which the inner ring of the ball bearing 19 is seated, the said bushing being retained in place by a collar 27, and snap ring or rings 28.

Longitudinal splines 30 which are provided on the end portion of the driving shaft perform the functions which will presently be referred to.

The driven shaft 18 is provided with an integrally formed gear 31. Immediately adjacent to said gear 31, a gear 32 of relatively larger diameter is mounted for rotative movement concentric with the shaft, same being journaled thereon, as shown in Figure 3. Clutch elements on this gear 32 consist of integral dogs 32ª at the hub area of said gear. Positioned at a location suitably distant from said gear 32 and upon the neck portion of said driven shaft, are integrally formed stub teeth 34 which will be presently particularly referred to.

A pilot portion 36 of the driven shaft, and which is of the suitable length shown in Figure 3, is journaled in a bore provided therefor in the driving shaft. 37 designates a thrust ring usual between the end of the driving shaft and the shoulder seat of the driven shaft.

A gear structure of annular formation, and which consists of a section 38 and a section 39 combined in seated coengagement and which said sections are united securely by pins 40 or by any other suitable means, has its outwardly flanged sides fixed to the inner rings of the ball bearings 15 and 16 respectively. Integral with this structure, is the external gear 41. An internal gear 42, and a relatively larger internal gear 43, each of which is integral with said structure, are in mesh with the gear 31 which is integral with the driven shaft, and the journaled or loose gear 32, respectively.

Power applied to gear 32 acts through gears 43, 42, and 31, to actuate the shaft 18. When power is applied directly through the shaft 18 and its stub teeth, the said gears 31, 42, 43 and 32 are idling.

Figure 9:
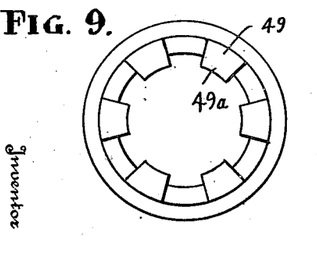
Figure 9 is an enlarged end view of the transmission sleeve 45, as seen in the direction indicated by arrow 9 in Figure 3.
Figure 10:
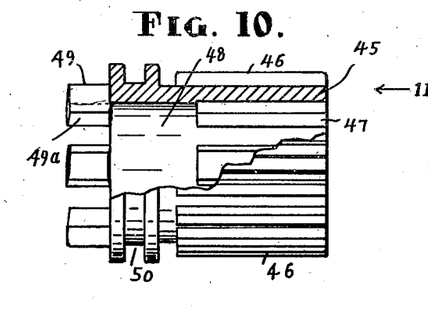
Figure 10 is a side view of said sleeve a portion thereof being shown in cross section.
Figure 11:
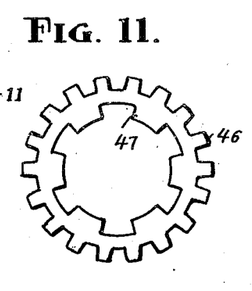
Figure 11 is an end view of said sleeve, as seen in direction of the arrow 11 in Figure 10.

Operable to establish transmission between the integral splines 30 of the driving shaft, and the clutch dogs of the aforementioned gear 32, is a sleeve member 45 of the structure illustrated in Figures 9, 10 and 11. Embodied in this sleeve member are external splines 46, and the interior splines 47 which latter mesh with the splines 30. Thus the sleeve is retained slidingly on the said splines 30 of the driving shaft. The bore 48 of the said sleeve is of diameter and length to clear the stub teeth 34 of the driven shaft.

On the rear end of said sleeve 45 are integral clutch dogs 49 which are related to the similar clutch dogs 32ª of the gear 32.

Teeth 49ª which are integral with the interior portions of the sleeve dogs 49 are adapted to mesh with the stub teeth 34 of the driven shaft. The grooved neck 50 of the said sleeve member, is engaged by the yoke of a holder device presently to be referred to.

In mesh with, and movable longitudinally on the said sleeve member, is a gear set comprising a gear 52, and a relatively larger gear 53. The grooved neck 54 is engaged by the yoke of a holder device.

On a countershaft 55 whose ends are fixed in the housing walls 1 and 2 by a screw or screws 55ª, or by other suitable means, is mounted for rotative and also longitudinal movement, a gear set consisting of a gear 56 and a relatively smaller gear 57, there being provided the grooved annular neck 58 which is engaged by the yoke of a holder device.

Movement of the gear 56 forwardly to mesh with gear 52 (which is slightly in advance of gear 57 meshing with gear 41) establishes transmission of power from the driving shaft 17 through sleeve 45, gear 52, 56. 57 and 41 to the annular gear structure. This is for first speed, and is through gears 42 and 31.

Movement of the sleeve member 45 forwardly, the teeth thereof 49ª coming into mesh with the stub teeth 34 of the driven shaft, establish transmission of power from the integral splines 30 of the driving shaft, directly to the driven shaft 18. This is for the third or direct speed; the annular gear structure now idling.

For the transmission of power from the driving shaft to the annular gear structure, so that the second speed and the fourth speed; and also the reverse drive may be obtained, additional gears are provided, and they comprise a gear set journaled on the fixed countershaft 60. This gear set has the gear 61 and two similar and relatively smaller gears 62 and 63 and the grooved neck 64. The several gear sets may be referred to by characters consisting of the conjoined numerals of the gears comprised in said sets, as follows; gear set 52—53 (comprising gear 52 and gear 53); gear set 56—57 (comprising gear 56 and gear 57); and gear set 61—62—63 (comprising gear 61, gear 63, and gear 62). In referring to these gear sets reference is made of Letters Patent granted to me February 12, 1924, No. 1,483,373, in which separate transmission gear units of this type are shown as slidable and rotatable on individual fixed shafts arranged in alignment with the driving and driven shaft, whereby to engage gears that are in connection with said shafts.

Holder devices (hereinafter referred to as holders), four in number, and which have yoke-arm connections with the grooved necks of the several gear sets, are operable to move the said gear sets from operative to inoperative position, and vice versa. Each of these holders is provided with a latch device whereby it is held firmly against dislodgment; the said latch device being yieldable however, to the force that moves said holders, as applied through the shift lever L of the car, and which will be presently referred to.

Figure 1:
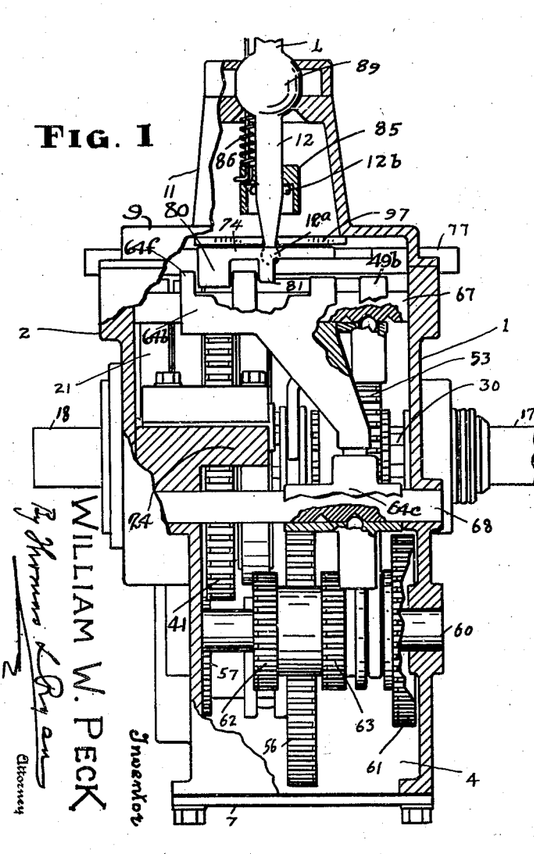
Figure 1 is a side view of my improved change speed mechanism, a part of the side wall of the housing being broken away.
Figures 2, 19:
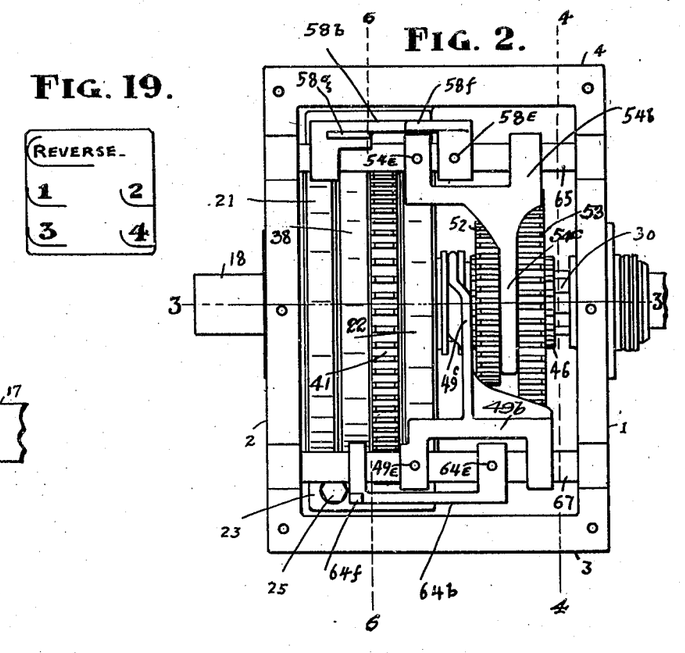
Figure 2 is a top plan view of Figure 1, the cover plate and shifter lever being removed.
Figure 19 is a diagrammatic plan view, showing the designations to which the shift lever is moved, to obtain the positioning of the gear set for the different speed changes for which the mechanism is intended.
Figure 8:
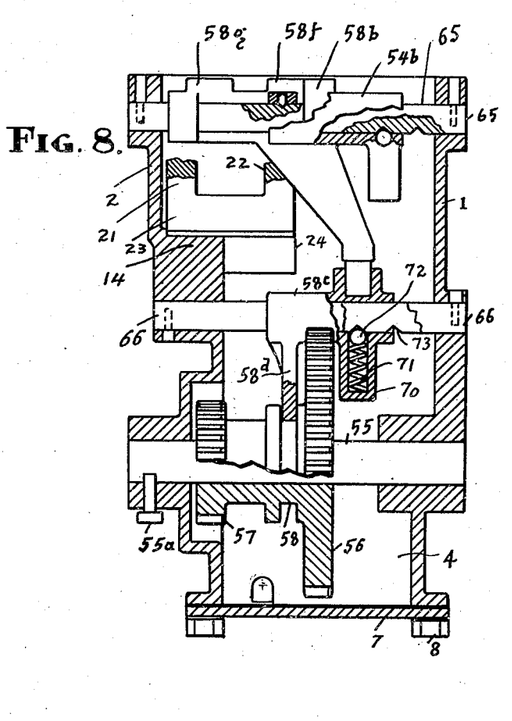
Figure 8 is a vertical longitudinal sectional view taken on the line 8—8 in Figure 4.

Reference is now made to Figure 2 of the drawings. Holder 54ᵇ is retained slidingly on a fixed support bar 65, and has yoke 54ᶜ which is engaged with the neck of the gear set 52—53. Holder 58ᵇ is retained slidingly on the fixed support bar 65 and has a downwardly disposed shank united with which is a subhead 58ᶜ which in turn has yoke 58ᵈ which is engaged with the neck of the gear set 56—57. Holder 49ᵇ which is retained slidingly on a fixed support bar 67, has yoke 49ᶜ which is engaged with the neck 50 of the sleeve member 45. Holder 64ᵇ is retained slidingly on the fixed support bar 67. United with its shank is a subhead 64ᶜ which in turn has yoke 64ᵈ which is engaged with the neck of gear set 61—62—63. The above named subheads 58ᶜ and 64ᶜ are slidingly disposed on the fixed support bars 66 and 68, as shown in Figure 8 and Figure 1, respectively.

Latch devices, as above mentioned, are provided in the body portions of the holders 54ᵇ and 49ᵇ; and in the subportions (58ᶜ and 64ᶜ) of the holders 58ᵇ and 64ᵇ respectively. The said latch device for each of said holders, consists of a boss 70 formed integral with the body portion of the holder (as shown in Figure 8) and in whose central bore is reposed a helical spring 71 and which presses firmly against a steel ball 72. Indentures 73 in the support bar are so spaced, and so located, that the holders are latched at proper locations relative to the desired positions of the gear sets. The extent of the movement of the several holders is indicated by the distance between the indentures in the support bars 65 and 66.

Figures 14, 16:
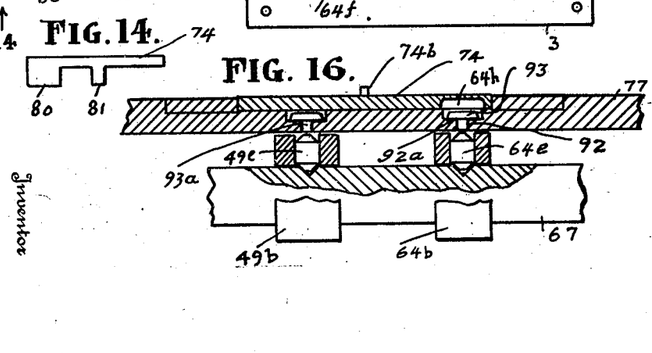
Figure 14 is an end view of the said head plate 74 as seen in the direction of arrow 14 in Figure 13.
Figure 16 is an enlarged detail sectional view taken on the line 16—16 in Figure 12, showing the interlock pins and parts of two of the holders.

In the top portion of each of the aforesaid holders 58ᵇ, 54ᵇ, 49ᵇ, and 64ᵇ is a vertical bore, which is (when the holders are in the positions shown in the drawings) in registration with a transverse V shaped groove that is provided in the support bar upon which the said holder is slidingly retained. In each of these bores is retained, loose, an interlock pin, which is of the formation as shown in Figure 16, each end thereof being of tapered or cone-shaped formation and having a blunt nose. Each of these interlock pins rests with its lower end in the said V shaped groove in such manner, that when the holder is moved, the pin is caused to rise and then to rest upon the support bar, the upper portion of the pin projecting beyond the plane of the top of the holder. These interlock pins are designated 58ᵉ, 54ᵉ, 49ᵉ and 64ᵉ; their functions will be presently referred to.

The relative positions occupied by the several gear sets, and their holders, when the gear sets are not in mesh with the gearing intended to transmit the power to the driven shaft, are as shown in the drawings.

By the moving of one or the other of the holders, after its having been particularly selected, there is the establishment of transmission between the driving shaft and the driven shaft, for first, or for second, or for third, or for the fourth speed; and by the movement of two of the holders, after they have been particularly selected, there is the establishment of transmission between the driving shaft and the driven shaft, whereby the latter is operated in the reverse directions.

A mover-device which is capable of being actuated by the shifter lever L, and is operable to select and engage either one of the several holders aforesaid; and to move said holder so selected, the distance of its stroke, and then to return said holder to its initial position, consists of the parts as follows. Two frame members and which may be designated as mover bars 75 and 77, are retained at spaced distance apart by spaced cross bars 76 secured in parallelism to each other and at a right angle to said mover bars. The distance between said mover bars is such that they register in positions above the holder support-bars 65 and 67 respectively. These mover bars rest slidingly in suitable guideways therefor in the top of the housing, and in grooves in the sides of the cover plate 9 and thus they are suitably retained in position and are adaptable for movement longitudinally of the housing.

Resting slidingly upon the central portions of the mover bars 75 and 77, and between the said cross bars, and adapted for movement in either direction transversely of the mover device, is a head plate 74.

Figures 12, 13, 15:
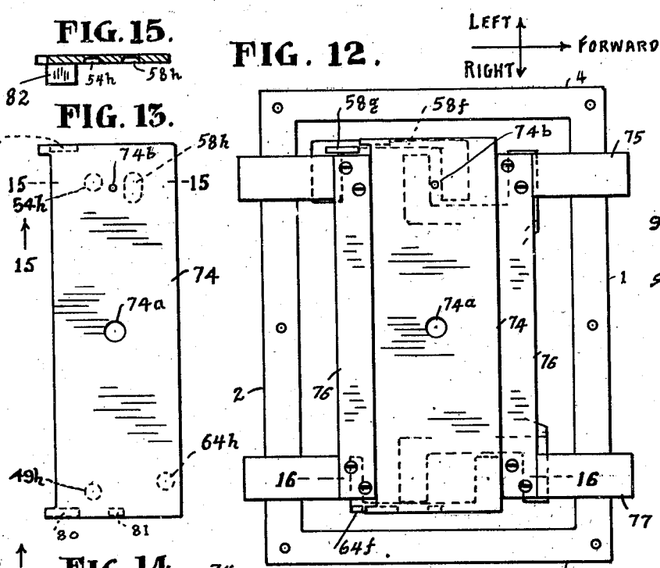
Figure 12 is a top plan view of the moverdevice by which the holders of the power transmitting gear sets are capable of being operated by the movement of the shift lever.
Figure 13 is a top plan view of the head plate 74 removed.
Figure 15 is a cross section view taken on the line 15—15 in Figure 13.

A plan view of the mover device just described is shown in Figure 12; reference is now made also to Figures 13, 14, 15 and 16. The directions, forward and rear, and right and left, are indicated by the initialed arrows in Figure 12.

A central bore 74ᵃ in the said head plate is adapted to be engaged by the head 12ᵃ of the shank 12 of the shifter lever L. Thus, it is practicable, by means of the shifter lever L, to shift the mover-device in its entirety to forward or to rearward positions; and also to shift the head plate either to the right or to the left.

Figures 17, 18:
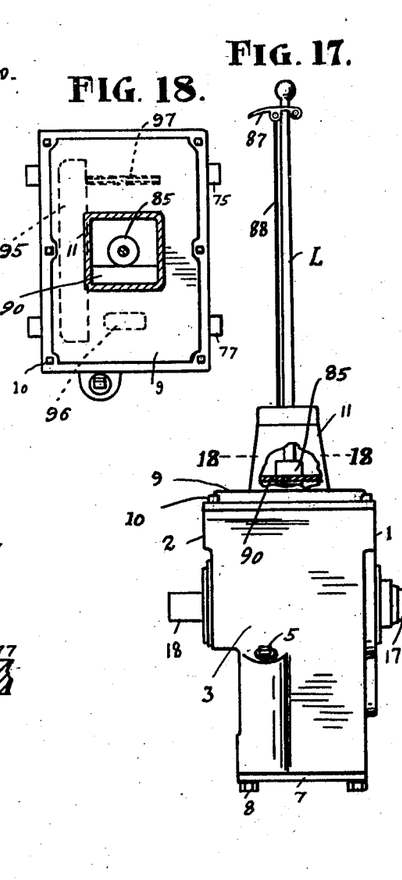
Figure 17 is a side view on a reduced scale, showing the exterior of the housing, and also the shift lever L and its thumb-lever connection.
Figure 18 is a top plan sectional view taken on the line 18—18 in Figure 17.

Retained slidingly on the said shank 12 of the control lever, and having its downward movement limited by a stud 12ᵇ, is a collar 85. This collar is urged yieldingly to the lowered position shown, by a helical spring 86, and it is capable of being raised by the operator actuating the thumb lever 87. This thumb lever 87 is attached to the shifter lever immediately under the head thereof, and is connected to the said collar 85 by a wire 88 which passes through a bore provided therefor in the body ball 89 of said lever as shown in Figures 1 and 17. A ledge 90 which extends from the inner face of the right hand side of the housing 11, is of such location that movement of the shift lever L to the left an extreme distance is prevented; except at such time as may be desired, as will be presently referred to.

Figure 4:
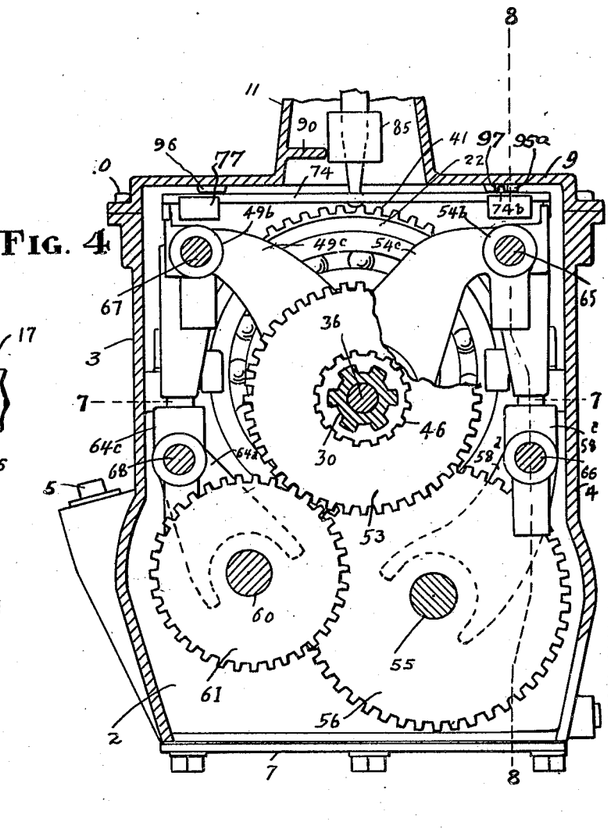
Figure 4 is a vertical cross section view on the line 4—4 and in direction of the arrow 4 in Figure 3, parts of the gears being broken away.
Figure 5:
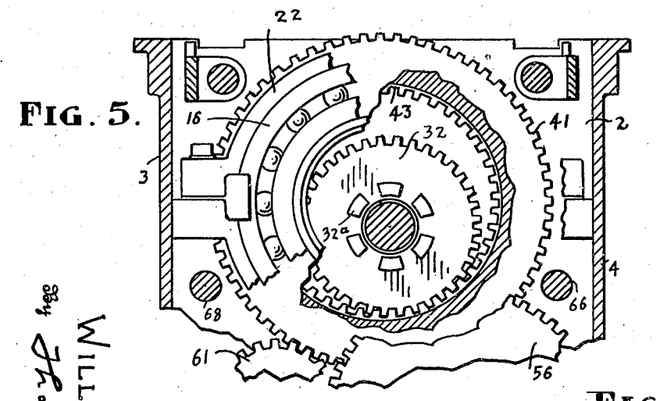
Figure 5 is a vertical cross section view on the line 5—5 in Figure 3, parts of the gears, and of the lower portion of the end wall of the housing having been broken away.
Figure 6:
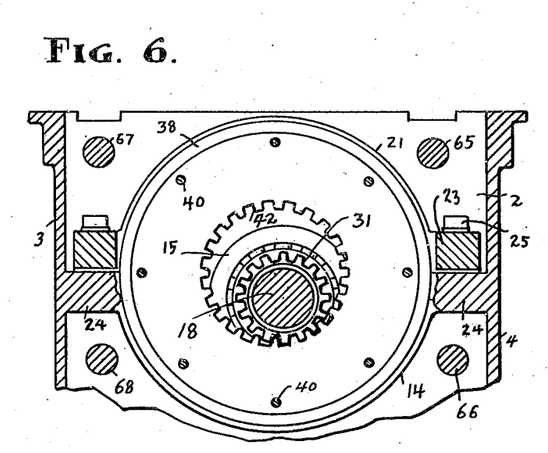
Figure 6 is a vertical cross section view on the line 6—6 in Figure 3, the lower portion of the end wall of the housing have been broken away.
Figure 7:
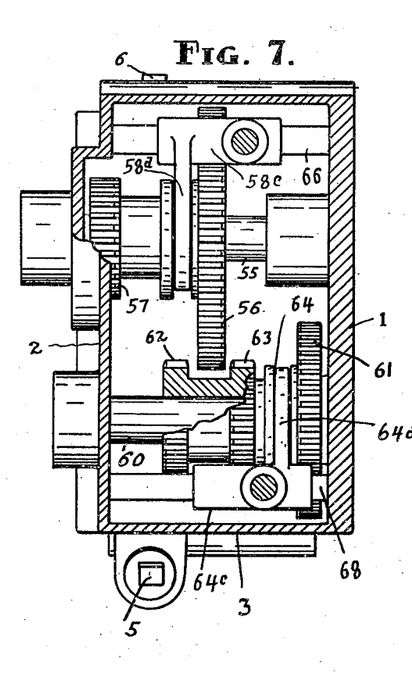
Figure 7 is a sectional top plan view taken on line 7—7, in Figure 4.

At the right hand end of the head plate 74, are downwardly disposed tongues 80 and 81 spaced apart as shown; and on the left hand end of said plate is a downwardly disposed tongue 82. The certain status in which the head plate 74 is shown in the drawings, (see Figure 12) may be designated as the central position. When the head plate is in this said central position, the tongue 80 is at direct registration with the tooth 64$^f$ of the holder 64$^b$; and the tongue 82 is in registration in alignment with the tooth 58$^f$ of holder 58$^b$. When the said head plate 74 will have been shifted to extreme left position, then the tongues 80—81 are in straddling registration with the head of holder 49$^b$, (tongue 82 being in the clear). When the plate 74 will have been shifted to extreme right position, then the tongue 82 is in position between the head of holder 54$^b$, and the tooth 58$^g$ of holder 58$^b$. Near the left hand end of the said head plate and centrally thereof is a stud 74$^b$. The location of this stud is such that when the plate 74 is in the aforesaid central position the stud is in registration in alignment with the guard channel 97, as shown in Figure 4.

In the underside of each of the mover bars 75 and 77, at positions to register immediately above the interlock pins of the several holders, when the several parts are in the relative positions as shown in the drawings, are bores 92 and each is of diameter less than the diameter of the interlock pin. Each of the bores 92 is provided with an annular concentric recess or seat 92$^a$. A button 93 having a central shank 93$^a$ to occupy loosely the said bore, is by its own specific gravity, at rest; the bottom of its stem being in registration with the plane of the bottom face of the mover bar.

The head plate 74, as shown in Figure 16 reposing in its guideways in the mover bars 75 and 77, prevents these buttons from being raised, except at such times as a recess (presently to be described) on the underside of said plate, comes into registration with the particular button desired to be actuated, when the said head plate will have been moved to the right or to the left. Bosses 96 and 96$^a$ formed integral with the underside of the cover plate 9 have their faces on a plane immediately above the top face of head plate 74 and serve therefore to guard against movement upwardly of the plate.

On the underside of the head plate, there is provided a recess 58$^h$, of oblong formation, and a circular recess 54$^h$, a circular recess 49$^h$, and a circular recess 64$^h$ (see Figure 13). These several recesses are so located, with reference to the said interlock pins, that when the holders are in the given positions as shown in Figure 2, and the head plate is in the aforesaid central position, they are as shown in Figure 12.

The positions of the several gear sets and their holders, and the interlock pins thereof, when the driven shaft 18 is at rest, are as shown in the drawings. All of the interlock pins are at their normal or low status, as seen in Figure 16. The recesses 64$^h$ and 58$^h$ being at registration above the pins 64$^e$ and 58$^e$, the buttons 93 beneath same are free to rise; the interlock pins 64$^e$ and 58$^e$ respectively, being also free to rise.

A description of the functioning of the several parts, when the shifter lever is operated in conformity with any one of the indicator characters shown in Figure 18, (namely first, second, third, fourth and reverse), whereby there is the selecting and engaging for movement the particular holder that is intended to be moved; and whereby the holder so selected is then moved; and whereby movement of any of the other holders during the movement of the selected holder is prevented, is as follows.

By movement of the lever L, the head plate 74 will have been brought to the position shown in Figure 12, and which is designated as the central position. In this position the said plate is operative for first and second speeds.

For first speed; the moving of the lever L rearwardly, moves the mover-device forwardly, the head plate 74 thereof by its tongue 82 (impinging against the lug 58$^f$) moves the holder 58$^b$, simultaneously the interlock pin 58$^c$ is caused to rise and in so rising it establishes a connection between the said holder and the mover bar 75 (this pin connection is for the purpose of causing the holder 58$^b$ to be carried rearwardly when the shifter lever L is moved in the direction opposite to that above referred to).

For second speed; the moving of the lever L forwardly (from the position it had been moved to for first speed) moves the head plate 74 rearwardly, tongue 80 engages tooth 64$^f$. Pin 64$^e$ establishes connection between the mover bar 77 and the holder 64$^b$. (Pin 58$^e$ will have lowered, as also its button 93, at the moment the plate 74 will have reached the central position).

For third speed; the lever L is drawn rearwardly and when at vertical position is then thrown to right (the head plate 74 moving to the left) the tongues 80 and 81 being brought to straddling relation with the head of holder 49$^b$; then with the moving of the lever L rearwardly, the holder 48$^b$ is moved. Simultaneously with the starting of this movement of the holder 49$^b$ the pin 49$^e$ establishes connection with the mover bar 77. (In this connection the pin 49$^e$ is not depended upon for the later moving of the head 49$^b$.) The purpose of the establishment of this connection will be presently referred to.

For fourth speed; the moving of the lever L forwardly (from the position it was in when moved for the third speed position) (the head plate 74 having its tongues 80 and 81 straddling the head of holder 49$^b$) moves the mover-device rearwardly to the central position shown in Figure 12, the tongue 81 causing the movement of holder 49$^b$ accordingly. During this travel of the head plate 74, the pin 49$^e$ is at raised position (to not interfere with the moving of the holder 49$^b$), but as the plate 74 reaches central position, the pin 49$^e$ lowers, thereby disengaging the holder 49$^b$ from the mover bar 77. Then as the mover device continues in its travel rearwardly, the tongue 81 completes the movement of the holder 49$^b$ to destination.

For reverse; the shifter lever L is pulled rearwardly to the vertical position (the head plate 74 being brought to the central position) then by the thumb lever 87, the collar 85 is raised; (in which raised position it clears the ledge 90). Then the lever L is moved to the extreme left, (the head plate 74 moving to the extreme right) tongue 82 being thus brought to position between the head of the holder 54$^b$ and the tooth 58$^g$ of holder 58$^b$. Then with the moving rearwardly of the lever L the holders 54$^b$ and 58$^b$ are both moved, the pins 54$^e$ and 58$^e$ having risen, and not interfering with the movement of the said holders.

Reference is here made to the guard channel 97 (see Figures 3 and 4—also Figure 18). This guard channel which is secured to the underside of the cover plate 9, is U shaped in cross section, there being a central gateway 97$^a$ in each side thereof. The function of this guard channel is such that whereas the head plate 74 is not guarded against movement either to the right or to the left from its central position shown, it is guarded against dislodgment from either of the several different positions forwardly or rearwardly, to which it may be moved, when the mover device is shifted. The functions performed by the several parts in the shifting of the said head plate 74 are as follows. When the head plate is moved to the right and then is moved either forwardly or rearwardly the stud 74$^b$ is at the right of the guard channel 97, and tongue 82 is engaged with the left side of the bar 75.

When the head plate is moved to the left and then either forwardly or rearwardly, stud 74$^b$ is at the left of guard channel 97, and tongue 80 is in engagement with right side of the bar 77. Thus the head plate 74 is stayed against dislodgment from the location to which it may have been moved, until such time as it may be changed to another position by another actuation of lever L.

The action of the several holders, and of the gear mechanisms for the different speed changes referred to, are as follows.

For first speed; the holder 58$^b$ with its subhead 58$^c$ moves gear 56 forward to mesh with gear 52 and which meshing is slightly in advance of the moment of the meshing by gear 57, with gear 41. Power from the driving shaft 17 is now acting through splines 30, sleeve 45, gears 52, 56, 57 and 41, and the internal gear 42 and the integral gear 31 to driven shaft 18, gears 42, 32 idling.

Return of lever L to neutral position, disengages gears 56—57 from gears 52 and 41.

For second speed change; holder 64$^b$ with its subhead 64$^c$ moves gear 61 to rear into mesh with gear 53, just slightly in advance of the moment that gear 62 meshes with gear 41. Power from the driving shaft 17 is now acting through splines 30, sleeve 45, gears 53, 61, 62 and 41, and the internal gear 42 and the integral gear 31 to the driven shaft 18.

Return of the lever L to neutral position disengages the gears 61, 62, 63 from gears 53, 56 and 41.

For third speed change; the holder 49$^b$ moves sleeve 45 forward, the teeth 49$^a$ then meshing with the stub teeth 34 of the driven shaft 18. Power from the driving shaft 17 is now acting directly to the driven shaft 18. Gear 52—53 is idling. The eccentric gear structure and its gears, and also the journaled gear 32 are inactive, or floating.

For fourth speed; the holder 49$^b$ shifts sleeve 45 to rear, the clutch dogs 49 thereof making engagement with the complemental clutch dogs 32$^a$ of the journaled or propeller gear 32. Power from the driving shaft is now acting through splines 30, the sleeve 45 and its dogs 49, through dogs 32$^a$, gear 32, the internal gears 43 and 42, and the gear 31 to the driven shaft 18.

Return of the lever L to neutral position, moves the sleeve 45 forwardly and disengages the clutch dogs.

For reverse; the holders 54$^b$ and 58$^b$ move the gear 53 into mesh with gear 63, just in advance of the meshing by the gear 57 with gear 41. Gear 53 catches up gear 61 ahead of the gear 56 picking up gear 63. The gear 57 picks up gear 41 after gear 63 and gear 56 have started into coengagement. Thus arranged there is no liability of clash when the shift is made at the time the vehicle is at a standstill. Of course when the vehicle is under moving headway, the meshing of the gears occurs freely and without momentary advancement or recession being considered.

Features of this invention are that there are no operating gears in mesh when the direct drive is being used; no operating gears in mesh when in neutral position; and no constantly meshing operating gears, and no idle gears at any point even for providing the reverse drive; all of which contributes to the smooth, quiet and economical operating of the mechanism.

A change speed mechanism constructed in accordance with my invention is of minimum dimensions both as to length and width, and while the parts are operable in close relation to each other they are capable of being amply lubricated. Openings 95 provided in the driving shaft permit of the free entry of lubricant into the bore in which the pilot 36 of the driven shaft has its bearing.

Channels 96$^b$ on the inner face of the wall 2 permit of the free flow of lubricant to, and a packer ring 98 constitutes a suitable closure immediately at, the bearing of the driven shaft. It will be understood that to facilitate meshing, the teeth of the several gears are suitably chamfered as shown in the drawings.

Whereas the articulation between the driving shaft and the driven shaft is sufficiently yielding, the connection between them is positive and there is no tendency to abnormal wear. Although the several gears are compactly arranged, there are ample clearances and the said gears are of strength to withstand the most severe strains. Rapid pick-up, smooth and quiet running at third and fourth speeds, ease of control and operation and durability are among the advantages afforded by my invention. Quick pick-up may be had in third speed, and in fourth speed, and amply fast travel is afforded for regular high road speed or emergency speed. Tendency to vibration is minimized, and engine efficiency is improved.

Further advantages of the invention are that the cost of processing and of assembling of the several parts may be established on a basis materially improved over the methods necessary in the manufacture of change speed mechanisms of conventional type.

My improved change speed mechanism, as made up in the form and embodiment chosen herein, is especially adaptable for use in connection with automobiles of the lighter class. In the power plant structure of an automobile of the above named class, the distance between the engine shaft and the propeller shaft is such that the present mechanism may be easily substituted for the standard or usual three speed mechanism; and it is of ample strength and efficiency to dependably perform every function for which it is intended.

At sixty miles an hour, the engine of the car which is equipped with my invention revolves no faster when in the fourth speed connection, than in the usual three speed transmission operating to move the car at forty-five miles an hour. By affording this comparatively low engine speed, engine wear and noise is minimized, and tendency to vibration of the driving shaft is materially reduced. Consequently there is improved economy in fuel and lubrication, and a minimizing of the tendency of the motor to become heated or to accumulate carbon deposits.

This improved speed change transmission is controlled, as to first, second and third speeds, by movement of the shift lever in substantially the same manner as in the usual three speed transmissions. This is desirable because the fourth speed is used only for the highest road speed and which said highest speed is not normally needed. For fourth speed the shift lever is moved forwardly. For reverse, the lever is pulled rearwardly to vertical position, and thence simultaneously with the actuation of the thumb lever 87, it is moved to the extreme left.

While I have shown and described but one embodiment of my invention, it is obvious that numerous changes may be made therein, and I do not wish to be limited except by the scope defined by the appended claims, and which said claims are to be construed as broadly as the state of the art permits.

What I claim as my invention, and desire to secure by Letters Patent, is—

1. A change speed mechanism comprising a housing, aligned rotatable members journaled therein, a gear fixed on one of the rotatable members, a gear mounted for rotative movement concentric with said rotatable members and which is provided with clutch surfaces, an annular gear structure mounted in the housing for rotative movement eccentric to the said rotatable members, said gear structure having an external gear, and internal gears, one of said internal gears being in mesh with the gear that is fixed on one of the rotatable members and another of said internal gears being in mesh with the said rotatably mounted gear that has the clutch surfaces, stub teeth integral with the rotatable member that has the fixed gear thereon, a sleeve member internally and externally splined and having clutch dogs thereon, said sleeve member being splined on the other rotatable member and being operable to establish transmission between said other rotatable member and the said stub teeth of the first named rotatable member, and also being operable to establish clutching coengagement between the said other rotatable member and the clutch surfaces of the said rotatively mounted gear, and gearing operable to establish transmission between the sleeve member and the said annular gear structure.

2. A change speed mechanism of the kind described, comprising a housing, a driving shaft and a driven shaft journaled in said housing in straight alignment, a gear fixed on, and a gear journaled on the driven shaft, the said journaled gear being provided with clutch dogs, an annular gear structure mounted in the housing for rotative movement eccentric to the said shafts, said gear structure having an external gear, and two internal gears, one of the said internal gears being in mesh with the gear that is fixed on the driven shaft, and the other of said internal gears being in mesh with the said journaled gear, stub teeth integral with the said driven shaft, splines on the driving shaft, a sleeve splined on the driving shaft, and being provided with exterior and interior teeth, and with clutch dogs, the said sleeve being operable to establish driving transmission between the stub teeth of the driven shaft and the driving shaft, and being also operable to establish clutching engagement between the clutch dogs of the aforesaid journaled gear and the said driving shaft, and a gearing to establish transmission between the said sleeve member and the said annular gear structure.

3. A change speed mechanism of the kind described, comprising a housing, a driving shaft and a driven shaft journaled in said housing in straight alignment, an integral gear, and a journaled gear on the driven shaft, the said journaled gear being provided with clutch dogs, an annular gear structure mounted in the housing for rotative movement eccentric to the axis of said shafts, said gear structure having an external gear and two internal gears, one of said internal gears being in mesh with the said integral gear, and the other of said internal gears being in mesh with the journaled gear of the driven shaft, stub teeth integral with the driven shaft, splines on the driving shaft, a sleeve member slidable but held non-rotatively on said splines and which is provided with clutch dogs complemental to the clutch dogs of the said journaled gear, internal teeth on the sleeve to register with the said stub teeth, the said sleeve member being operable to and from position disengaged from either the clutch dogs or said stub teeth, a device operable to hold and also to move said sleeve member, and gearing operable to establish transmission between the sleeve member and the annular gear structure when the said sleeve member is disengaged from said clutch dogs and said stub teeth.

4. In a change speed mechanism which comprises a driving shaft and a driven shaft, and a gearing for the driven shaft which is adapted to be actuated by a clutch dog connection, the said driven shaft being provided with integral stub teeth, and the driving shaft being provided with integral splines, a sleeve member internally meshed with and slidable longitudinally on the said splines, and which is provided with clutch dogs to engage the clutch dogs of the above named gearing, teeth integral with the inner sides of the dogs and adapted to mesh with the said stub teeth, a holder to hold the sleeve member disengaged from the clutch dogs and disengaged from the stub teeth, and operable to move the sleeve member to establish connection either with the clutch dogs of said gearing, or with the stub teeth of the driven shaft, and gearing operable to establish transmission between the sleeve member and the said driven shaft gearing, when the sleeve member is disengaged from the clutch dogs and said stub teeth.

5. A change speed mechanism, comprising a housing, a driven shaft and a driving shaft mounted therein in axial alignment, a first gear integral with the driven shaft, stub teeth integral with the driven shaft, splines integral with the driving shaft, an annular gear structure mounted for rotation eccentric to the axis of said driven and driving shafts embodying an external gear, a smaller internal gear, and a larger internal gear; the smaller internal gear being in mesh with the first integral gear of the driven shaft, a propeller gear mounted for rotation concentric with the axis of said shafts and in mesh with the larger internal gear and which is provided with clutch surfaces, a sleeve member in mesh with but movable longitudinally of the said splines of the driving shaft and having clutch surfaces related to the clutch surfaces of the propeller gear, and being provided with internal teeth which are related to the stub teeth of the driven shaft, a holder device to normally hold the sleeve member against longitudinal movement, but which is operable to move the said sleeve member to and from clutching engagement with the propeller gear, and which said holder is also operable to move the sleeve member to and from meshing engagement with the stub teeth of the driven shaft, transmission gears between the sleeve member and the external gear of the annular gear structure, a holder device loosely engaged with and adapted to hold each unit of the transmission gearing at the predetermined positions to which they may be moved, and control means operable to engage for movement any one of the said holder devices and to move the said holder device so engaged, whereby the gear unit associated therewith is shifted from inoperative position to operative position, and vice versa.

6. A change speed mechanism comprising a housing, a driven shaft, a gear wheel integral therewith, a drive gearing eccentric to and internally geared to the said integral gear, the said eccentric gearing comprising an external gear, a propeller gear journaled independently of said driven shaft, and which is operable by said eccentric gear, and is provided with clutch surfaces, stub teeth integral with the driven shaft, a driving shaft, splines integral therewith, a sleeve member meshed with said splines and being provided with clutch surfaces related to those of the propeller gear, internal teeth integral with the sleeve and which are related to the stub teeth of the driven shaft, means to hold the sleeve member normally at idling position but operable to move it either to clutching engagement with the propeller gear, or into mesh with the stub teeth of the driven shaft, a driver gearing geared to the sleeve member, transmission gears for transmitting the power from the driver gearing to the sleeve at varied speeds, and from the driver gearing to the external gear of the drive gearing at varied speeds, holder devices to hold the different transmission gears at the predetermined positions to which they may be moved, and control means operable to engage for movement and to move the said holder devices so engaged, whereby to shift said transmission gears.

7. For a change speed mechanism of the kind described, a sleeve member having its body portion externally and internally splined, and having a head portion adapted for engagement by a holder device, and there being a concentric bore in the said head portion, clutch dogs formed integral with the said head portion, and internal gear teeth formed integral with the said clutch dogs.

8. For a change speed mechanism of the kind described, a member comprising a sleeve like body having external splines throughout a portion of its length, the head portion of said body being adapted for engagement by a holder device, and there being a concentric bore in the said head portion, internal splines throughout the main portion of said sleeve body, internal teeth integral with the said head portion, clutch dogs integral with the said head portion and a gear meshed on said external splines and which is adapted to be engaged by a holder device.

9. For a change speed mechanism of the kind described comprising a housing, and a driven shaft mounted rotatably therein, and having a pinion gear fixed thereon and provided with integral stub gear teeth, a drive gearing for said driven shaft, consisting of complementary circular united body sections, an annular ball bearing on each of said body sections, support means formed integral with the interior of the housing, to retain the said bearings and said body sections in longitudinal alignment with but eccentric to the axis of said driven shaft, an internal gear formed integral with one of the body sections and which is adapted to mesh with the pinion of the driven shaft, an internal gear of relatively larger diameter formed integral with the other body section, an external gear integral with one of the body sections, a propeller gear to mesh with the last named internal gear, and which is adapted to be mounted for rotation on a center coincident with the axis of the driven shaft, and upon the face of which propeller gear are provided clutch dogs, a driving shaft, transmission devices between the driving shaft and the said external gear, a clutch device operable between the driving shaft and driven shaft and between the driving shaft and the propeller gear.

10. For a change speed mechanism of the kind described comprising a housing, a shaft mounted rotatably therein and having an integral pinion gear, and integral stub gear teeth thereon, a drive gearing for said shaft consisting of a body structure, an annular ball bearing on each side thereof, support and grip devices engaging the peripheral portions of said bearings, to maintain said bearings and the said body structure in longitudinal alignment with but eccentric to the axis of said shaft, integral internal gears carried by the body structure one of which is adapted to mesh with the integral gear of said shaft, an external gear integral with the said body structure, a propeller gear mounted for rotation and in mesh with the other of the internal gears, and clutch surface protrusions on said propeller gear, a driving shaft, transmission devices between the said driving shaft and the external gear, a clutch device operable between the driving shaft and the stub gear teeth of the driven shaft, and between the driving shaft and the protrusions of the said propeller gear.

In testimony whereof I affix my signature.

WILLIAM W. PECK.